United States Patent [19]

Womack

[11] Patent Number: 5,403,391
[45] Date of Patent: Apr. 4, 1995

[54] ROSIN DICYCLOPENTADIENE RESINS CONTAINING INK FORMULATIONS

[75] Inventor: Gary B. Womack, Lawrenceville, N.J.

[73] Assignee: Westvaco Corporation, New York, N.Y.

[21] Appl. No.: 993,071

[22] Filed: Dec. 18, 1992

Related U.S. Application Data

[62] Division of Ser. No. 967,757, Oct. 28, 1992.

[51] Int. Cl.$^6$ ......................... C09D 5/00; C09D 11/00
[52] U.S. Cl. ............................... 106/20 R; 106/30 R; 106/32; 523/161
[58] Field of Search .................... 106/20 R, 30 R, 32; 523/161

[56] References Cited

U.S. PATENT DOCUMENTS 4,574,057  3/1986  Kaza et al. ........................ 526/283

*Primary Examiner*—Peter D. Mulcahy
*Attorney, Agent, or Firm*—Terry B. McDaniel; Daniel B. Reece, IV; Richard L. Schmalz

[57] ABSTRACT

A rosin/hydrocarbon hybrid resin is disclosed to be prepared by reacting rosin with a phenolic compound and an aldehyde to form a phenol-modified rosin intermediate which is reacted with dicyclopentadiene at elevated pressure and temperature to form the rosin/hydrocarbon resin. The resin is particularly useful as a lithographic printing ink resin.

20 Claims, No Drawings

ROSIN DICYCLOPENTADIENE RESINS CONTAINING INK FORMULATIONS

This is a division of application Ser. No. 07/967,757, filed Oct. 28, 1992.

BACKGROUND OF INVENTION

1. Field of the Invention

The invention relates generally to rosin-based synthetic resins suitable for use in printing inks and to processes for their production. Particularly, the invention relates to rosin-dioyclopentadiene resins and lithographic ink formulations incorporating said resins.

2. Description of the Prior Art

To produce lithographic inks, two major types of ink resins are employed, rosin-based resins and hydrocarbon resins. The basic hydrocarbon resins are produced from either thermal polymerization of reactive olefins composed chiefly of dicyclopentadiene or Lewis acid catalyzed polymerization of various vinyl aromatic monomers.

Dicyclopentadiene (DCPD) is a material which will readily form hydrocarbon resins when heated to temperatures greater than 200° C. Polymerization apparently occurs through cyclopentadiene which is formed when dicyclopentadiene is heated above 170° C. Chain growth of the polymer proceeds via a free radical mechanism with both 1:4 and 1:2 addition occurring as is shown in Equation I below.

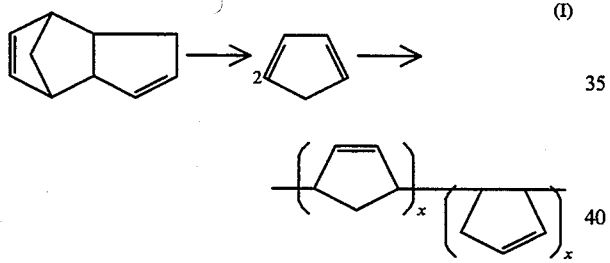

(I)

If dicyclopentadiene is heated to 200° C. and held there, the predominant reaction occurring is oligomerization by the Diels-Alder addition of cyclopentadiene to the norbornyl double bond of the dimer, trimer, etc., as set forth in Equation II below.

Usually, the largest oligomer formed is the pentamer. The Diels-Alder oligomers are often referred to as thermal polymer of dicyclopentadiene, but their low molecular weight and insolubility in organic solvents make them useless for commercial ink applications.

The reaction of rosin and tall oil with dicyclopentadiene under pressure at temperatures greater than 400° F. (204° C.) is known to produce a resinous material. The resins produced, claimed useful as synthetic surface coatings, particularly in the paint and varnish field, are light colored resins with low softening points and reduced acid numbers. The softening points of such resins made with rosin are in the range of 215°–250° F. (102°–121° C.). The resin products made from refined tall oil are liquids unless a substantial excess of cyclopentadiene is employed.

Cyclopentadiene can be used for the reaction with rosin and tall oil. However, as cyclopentadiene quickly equilibrates with dicyclopentadiene under the above conditions, the use of dicyclopentadiene produces similar products.

The drop in acid number of such products indicates the consumption of the acid function of the rosin or tall oil. This results from the addition of carboxylic acid functions across double bonds to produce esters. In the presence of dicyclopentadiene, it is assumed that this addition occurs across the norbornyl-type double bonds of DCPD, DCPD oligomers, and DCPD polymers, as set forth in Equation III, below.

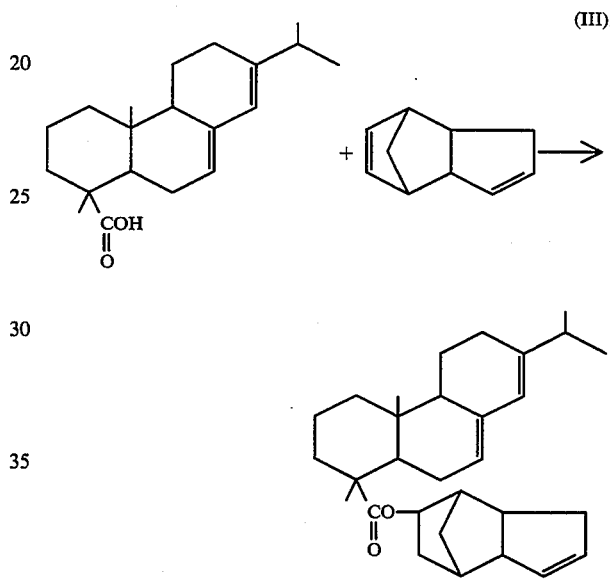

(III)

Likewise, the thermal polymerization of dicyclopentadiene with tall oil fatty acids is attributed, in U.S. Pat. No. 4,292,221, to the addition of the acid functions to the bicycloheptene double bonds of the hydrocarbon resin. The patentees teach fatty acid heated with dicyclopentadiene to produce resins suitable for offset printing.

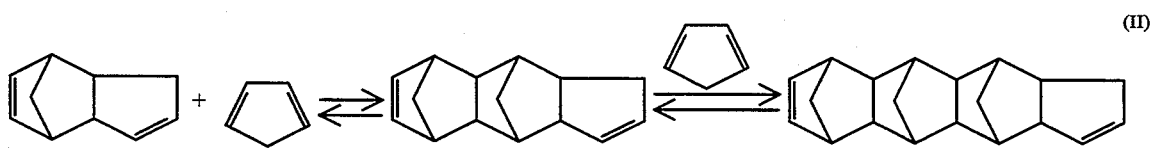

(II)

In U.S. Pat. No. 4,242,244, carboxylic acids are taught to add to preformed thermal cyclopentadiene resins if the resins contain the reactive bicycloheptene double bonds, as set forth in Equation IV below.

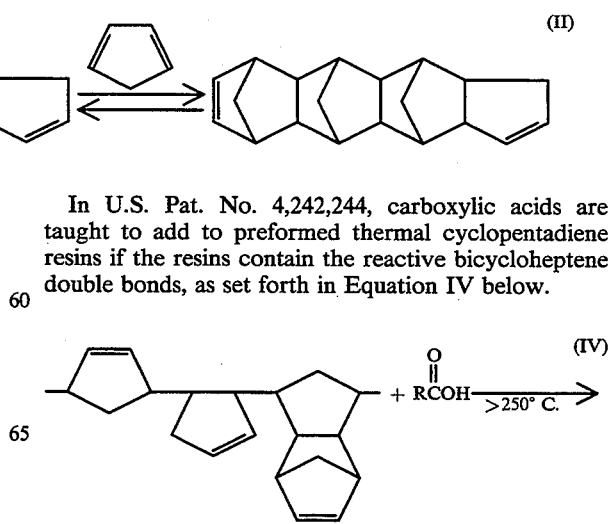

(IV)

-continued

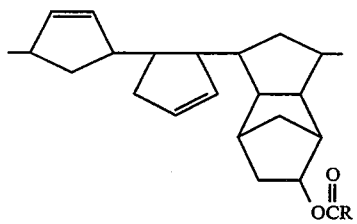

The reaction between dicyclopentadiene, a mixture of dimerized conjugated aliphatic cyclic and non-cyclic dienes of five carbon atoms, and distilled tall oil is described in U.S. Pat. No. 4,056,498 to produce an intermediate which is adducted with maleic anhydride to produce a final ink resin.

Printing ink resins are disclosed in U.S. Pat. No. 4,189,410 to be prepared by reacting dicyclopentadiene, rosin acids, and a hydrocarbon containing material selected from debutanized aromatic concentrates, $C_5$-olefins, and acyclic, conjugated $C_5$-dienes; and, in U.S. Pat. No. 4,433,100, printing ink resins are prepared by reacting dicyclopentadiene, rosin acids, and a hydrocarbon selected from mono-olefins, diolefins, and polyenes having more than five carbon atoms and no aromatic rings. In U.S. Pat. No. 4,474,057, printing ink resins are prepared by reacting dicyclopentadiene, tall oil or rosin acids, an ethylenically unsaturated lower aliphatic acid or anhydride, a material with two reactive groups including a hydroxyl group, and a hydrocarbon. The hydrocarbon can be that disclosed in U.S. Pat. Nos. 4,189,410 or 4,433,100, or it can be a dimerized aliphatic, cyclic, or non-cyclic diene of five carbon atoms.

Also, rosin-cyclopentadiene resins are disclosed for gravure printing in U.S. Pat. No. 4,092,283. A cyclopentadiene resin is heated with rosin and maleic anhydride to 250°-270° C. to form ester bonds, obtaining resins having an acid number of 60 and a softening point of 165° C. After several hours, metal oxides are added to form resinates.

It was found, however, that when rosin and dicyclopentadiene were thermally reacted, low acid number hybrid resins were obtained. Their major shortcoming was low Gardner viscosities relative to standard rosin-based or reactive hydrocarbon lithographic ink resins. In order to have a viable new resin for the lithographic ink market, hybrid resins with higher viscosities are needed.

It is an object of the present invention to provide a novel rosin-based resin suitable for use in printing inks.

A further object of the present invention is to provide a rosin-based resin having viscosity and solubility properties which enable its incorporation in lithographic inks.

SUMMARY OF THE INVENTION

The above objects of the invention are achieved by a process for forming a rosin/hydrocarbon hybrid resin, comprising:
a. Reacting rosin with a phenolic compound and an aldehyde to form a rosin-phenol intermediate; and
b. Reacting said intermediate with dicyclopentadiene at elevated pressure and temperature to form the rosin/hydrocarbon hybrid resin.

The invention also encompasses the novel resin product of this process, as well as the use of the resin product in lithographic ink formulations.

DESCRIPTION OF THE PREFERRED EMBODIMENT(S)

The invention process forms a novel resin with a softening point of at least about 130° C. with viscosity and solubility properties suitable for use in lithographic inks by forming a phenolic-modified rosin intermediate prior to reaction with dicyclopentadiene at elevated temperatures and pressures.

The base material of the phenolic-modified rosin is rosin, which comprises chiefly abietic and dehydroabietic acids. Rosins suitable for this invention include tall oil rosin, gum rosin, and wood rosin. Synthetic derivatives of these rosin acids may also be used. The modification of rosin with phenols is a well established method for producing rosin-based ink resins. The resins comprising the JONREZ TM RP-300 resin series (products of Westvaco Corporation) are commercially available resins of this class.

The phenol, generally an aryl or alkyl para-substituted phenol, is added to molten rosin followed by addition of formaldehyde or paraformaldehyde. The reactants usually are stirred at 120° to 130° C. for several hours and then heated to 200° C. to complete the process. The reaction mixture generally is maintained at 200° C. for at least one hour before discharge. Among the phenolic compounds that can be used to modify the rosin are phenol, bisphenol-A (4,4'-isopropylidenediphenol), para-tertbutylphenol, para-octylphenol, para-nonylphenol, para-dodecylphenol, para-phenylphenol, and mixtures thereof.

Although the mechanism of the reaction is not completely understood, it appears that an important aspect of the phenolic-modified rosin is that the rosin carboxylic acid groups remain intact, so that the phenolic-modified rosin can react with the norbornyl-type double bonds in the dicyclopentadiene resin. Thus, the phenolic-modified rosin is chemically bound to the dicyclopentadiene polymer yielding a phenolic-modified rosin/dicyclopentadiene copolymer.

Phenolic modification of rosin results in the formation of large rosin-phenol molecules through the formation of phenol-rosin adducts. It is believed that some of these adducts contain more than one rosin acid and, by reacting with more than one norbornyl-type double bond, are capable of acting as cross-linking agents between dicyclopentadiene polymer molecules. Therefore, it was discovered that the use of phenolic-modified rosins allows the synthesis of rosin/dicyclopentadiene resins of higher molecular weight, higher viscosity, and higher softening points than achievable using just rosin. In addition, the use of phenolic-modified rosin allows the preparation of rosin/dicyclopentadiene resins with combinations of viscosity, solubility, and softening point properties that cannot be obtained by using unmodified rosin.

In a further embodiment of the invention, the phenolic-modified rosin may be reacted with an α,β-unsaturated carboxylic acid, diacid, or anhydride. Examples of such compounds are acrylic acid, maleic anhydride, fumaric acid, itaconic acid and itaconic anhydride. Maleic anhydride is preferred. These compounds react with phenolic-modified rosin by a Diels-Alder addition, thus accomplishing adduct formation without loss of their carboxylic acid or anhydride functions. The reaction can be performed in the temperature range of 170°–220° C., with the range of 190°–210° C. preferred. In general, up to 15 weight % (based on the weight of rosin) maleic anhydride can be added to the reaction mixture, but it is preferred that from about 0.5% to about 8% maleic anhydride be used.

The molecular weight of the phenolic-modified rosin can be further increased by treatment with a compound containing more than one hydroxyl function (a polyol). Examples of suitable polyols are pentaerythritol, glycerin, ethylene glycol, and sorbitol. The polyol reacts with the phenolic-modified rosin to form esters. By cross-linking the phenolic-modified rosin, higher molecular weight modified rosin is obtained. The polyol can be used to cross-link the phenolic-modified rosin with or without the addition of the $\alpha,\beta$-unsaturated carboxylic acid species. If an $\alpha,\beta$-unsaturated carboxylic acid is used, it is preferred that the polyol be added after addition of the $\alpha,\beta$-unsaturated acid. The polyol usually is added to the phenolic-modified rosin at about 200° C. To effect esterification the mixture can be heated to temperatures of 200°–280° C. with 245°–265° C. being preferred. The mixture generally is maintained between 245° C. and 265° C. for a period of one to three hours. The polyol has to be used in an amount that is insufficient to esterify all of the carboxylic acid functions in the modified resin. This is necessary because carboxylic acid functions on the phenolic-modified rosin are needed to react with the norbornyl-type double bonds in the dicyclopentadiene polymer, effecting chemical linking between the modified rosin and the dicyclopentadiene polymer. Typically, an amount of polyol will be used that yields a phenolic-modified rosin with an acid number greater than 90.

Phenolic-modified rosin/dicyclopentadiene resins of the present invention are formed by heating a mixture containing these two components to temperatures of 240° to 280° C., preferably a temperature of 260° C. is used. The weight ratio of phenolic-modified rosin to dicyclopentadiene usually is about 1:1 to 1:3, respectively. The components are charged to a reactor which is then sealed and heated to 260° C. The procedure generally is performed under an inert atmosphere by purging the charged reactor with nitrogen prior to sealing it. As the mixture is heated, an autogenous pressure of between 70 and 160 psig is usually generated; but, after maximizing, this pressure falls to between 40 and 70 psig as the polymerization proceeds. The reaction mixture is maintained at 260° C. under pressure for a period sufficient to copolymerize the dicyclopentadiene and phenolic-modified rosin. Typically, a time of at least three hours is employed. Following this, the reactor is vented to reduce the pressure to 0 psig. Next, unreacted hydrocarbon monomers and inert compounds that would depress the softening point of the resin and give it an offensive odor are distilled from the reaction mixture. The removal of these materials is promoted by sparging the resin with nitrogen. Nitrogen is bubbled through the reaction mixture generally at a rate of 0.001 to 0.01 lb of $N_2$ per lb of reactants per hour. The length of this step is dependent on the desired properties of the resin but typically is conducted from three to thirteen hours.

The dicyclopentadiene typically employed is a technical grade containing from 75 to 85% dicyclopentadiene. Examples of such materials that are commercially available are DCPD 101, a product of Lyondell Petrochemical and DCP-80P, a product of Exxon, and the 75% and 85% DCPD product grades of Texmark. Other components in the dicyclopentadiene are inert hydrocarbons (such as toluene, xylenes, and saturated hydrocarbons with from 4 to 6 carbons) and various codimers and cotrimers formed by Diels-Alder addition of butadiene, cyclopentadiene, methylcyclopentadiene, and acyclic pentadienes.

In addition, aromatic hydrocarbons having a vinyl group conjugated to the aromatic ring can be incorporated into the reaction mixture. The vinyl aromatic compounds are incorporated into the growing dicyclopentadiene polymer by free radical addition to the vinyl group. Examples of such aromatic monomers are styrene, vinyltoluene, $\alpha$-methylstyrene, $\beta$-methylstyrene, indene, and methylindene. Typically, hydrocarbon mixtures that contain from 50 to 100% of such compounds are used. Other components found in these mixtures are usually inert aromatic compounds, e.g., toluene, xylenes, alkylbenzenes, and naphthalene. A commercially available example of such a mixture is LRO-90, a product of Lyondell Petrochemical. Typically, these materials may contain xylene (1–5%), styrene (1–10%), $\alpha$-methylstyrene (1–3%), $\beta$-methylstyrene (1–5%), methylindene (5–15%), trimethylbenzenes (1–20%), vinyltoluene (1–30%), indene (1–15%), and naphthalene (1–5%).

When incorporating vinyl aromatic monomers, the procedure for preparing the resin is the same. The vinyl aromatic component is added along with the phenolic-modified rosin and dicyclopentadiene. The aromatic component is added to the reaction mixture in an amount less than the dicyclopentadiene used. Generally, the aromatic component is employed in an amount no greater than about 30% by weight of the total reaction mixture. Preferably, the vinyl aromatic component is used from about 5 to 20% of the total reagent charge.

The resins of this invention are characterized by acid number, softening point, Gardner viscosity, and tolerance to ink solvents. The units for acid number as reported here are mg KOH/gram of resin. The resins of this invention typically will have acid numbers between 5 and 25 with values between 10 and 22 preferred. Gardner viscosity is determined by matching the rate of rise of a bubble through a solution of the resin to those of viscosity standards arranged in order from A to Z and Z1 to Z10; A being the least viscous and Z10 being the most viscous. All viscosity measurements were conducted at 25° C. Resins with Gardner viscosities in the range of Y to Z10 (50% in Magie 47 or 470 solvent) can be used in lithographic inks. Gardner viscosities also were obtained for solutions of the resins (33% resin) in linseed oil (ARLO). Resins of the present invention do not have to be soluble in ARLO to be used lithographic inks.

The tolerance value is the percent resin solids in a given solvent at which the solution becomes cloudy. It is performed by adding the solvent dropwise to a 50% solution of the resin in the solvent until one can no longer see through the solution. It is a measure of the compatibility of a resin for an ink solvent. A low tolerance value means the resin is very compatible with the solvent while a high, value (i.e., a value approaching 50%) has less compatibility with the solvent. The resins of this invention are compatible with ink solvents such as Magie 47 or 470 solvent at the 50% solids level. The viscosity and tolerance of the resins can be controlled by the composition of the resin and the processing conditions.

The novel resins of this invention are useful as lithographic printing resins. To make inks from resin described here, the resin and an alkyd (typically a #7 body linseed oil/isophthalic alkyd) are dissolved in a solvent (e.g., Magie 47 or Magie 470, products of Magic Brothers Oil Company, a division of Penzoil) used in lithographic inks and treated with an aluminum-based gelling agent (e.g., oxyaluminum octoate, OAO-EF a product of Chattem Chemical Co.) to form a gelled varnish. The gelled varnish is mixed with a flushed pigment concentrate (dry pigments or carbon black may also be employed), at a weight ratio of 65:35, respectively. The pigment concentrate and gelled varnish are further mixed using a three-roll mill. The ink thus prepared can be thinned by the addition of more solvent. In addition to being used as the sole resin component, the resins of this invention may be employed in combination with other resins to form useable lithographic inks.

EXAMPLE 1

Phenolic-Modified Rosins

A typical laboratory preparation of a phenolic-modified rosin is presented. This procedure was used to make the modified rosins listed in Table I. A two-liter, four-necked, round-bottomed flask, equipped with an overhead stirrer, thermometer, and reflux condenser, was charged with 650 grams of tall oil rosin (of a typical acid number of 175). The rosin was melted under nitrogen to a temperature less than 200° C. As the molten rosin was cooling, magnesium oxide (0.65 grams) was added and stirred in well. When the rosin temperature dropped to 150° C., bisphenol-A (65 grams) was added, and the mixture was allowed to cool to 130° C. At this temperature, paraformaldehyde (47.2 grams) was added over a period of two hours. The mixture was stirred an additional 1.5 hours at 120°–130° C. A Barret trap was added to the flask to remove water as the mixture was heated to 200° C. At 200° C., the molten resin was stirred for two hours and then poured into an aluminum pan and allowed to cool.

TABLE I

Properties of Phenolic-Modified Rosins

| Sample Number | Phenol(s) | Weight % Phenol and Paraformaldehyde Added to Rosin | | Softening Point (°C.) | Acid Number |
|---|---|---|---|---|---|
| | | Phenol | Paraformaldehyde | | |
| I-1 | Bisphenol-A | 10 | 7.3 | 129 | 143 |
| I-2 | tert-butylphenol | 15.2 | 7.7 | 130 | 130 |
| I-3 | tert-butylphenol | 30 | 15.2 | 146 | 113 |
| I-4 | Nonylphenol | 35 | 12.2 | 123 | 110 |
| I-5 | Nonylphenol | 50 | 17.3 | 128 | 106 |
| I-6 | Bisphenol-A/Nonylphenol | 10/10 | 10.1 | 126 | 127 |

EXAMPLE 2

Phenolic-Modified Rosin/Dicyclopentadiene Resin

Proportions of phenolic-modified rosin (from Example 1) and dicyclopentadiene, as indicated in Table II, were charged into a one-liter autoclave reactor. The charged autoclave was purged with nitrogen and sealed. The reaction mixture was heated to 260° C. within 60 minutes and maintained at 260° C. for six hours. The reactor then was vented carefully, and the molten resin poured into an aluminum pan and allowed to cool.

Next, the resin was remelted and purged with nitrogen to remove volatile components. In a typical procedure, 200–230 grams of resin were added to a 500-ml, four-necked, round-bottomed, flask, equipped with an electric heating mantle, overhead stirrer, thermometer, nitrogen inlet tube, and a Barret trap attached to a water-cooled condenser. The vessel was purged again with nitrogen as the resin was heated to 260°0 C. At 260° C., the nitrogen inlet tube was immersed in the liquid resin and the nitrogen flow rate adjusted to 236 to 472 ml/min. The resin was sparged for four hours and then discharged into an aluminum pan.

Using this procedure, resins were made from two different grades of dicyclopentadiene and the phenolic-modified rosins listed in Table I. The properties of the sparged phenolic-modified rosin/dicyclopentadiene resins are listed in Table II. For comparison, resins also were made using unmodified tall oil rosin and the same two grades of dicyclopentadiene (see Table III).

TABLE II

Properties of Phenolic-Modified Rosin/Dicyclopentadiene Resins
(Dicyclopentadiene Obtained from Texmark)

| Sample Number | Phenolic-Modified Rosin Used | Weight Ratio of Phenolic-Modified Rosin to DCPD | DCPD Grade | Acid Number | Softening Point (°C.) | Gardner Viscosities | | Tolerance to Magie 47 Solvent |
|---|---|---|---|---|---|---|---|---|
| | | | | | | 33% Solids in ARLO | 50% Solids in Magie 47 Solvent | |
| II-1 | I-1 | 1/0.8 | 85% | 27 | 135 | U+ | X-Y | 32 |
| II-2 | I-1 | 1/1.6 | 85% | 16 | 182 | Insoluble | Z10 | 39 |
| II-3 | I-1 | 1/2 | 75% | 14 | 170 | Insoluble | Z3-Z4 | 31 |
| II-4 | I-1 | 1/3 | 75% | 9 | 193 | Insoluble | Z9— | 42 |
| II-5 | I-2 | 1/1.5 | 85% | 12 | 162 | V-W | X-Y | — |
| II-6 | I-2 | 1/1.3 | 75% | 16 | 159 | Z1-Z2 | W | 24% |
| II-7 | I-4 | 1/1.25 | 75% | 14 | 143 | V-W | V | — |
| II-8 | I-4 | 1/3 | 75% | 7 | 190 | — | Z6— | 25 |
| II-9 | I-5 | 1/3 | 75% | 5 | 168 | — | Z2— | 9 |

TABLE II-continued
Properties of Phenolic-Modified Rosin/Dicyclopentadiene Resins
(Dicyclopentadiene Obtained from Texmark)

| Sample Number | Phenolic-Modified Rosin Used | Weight Ratio of Phenolic-Modified Rosin to DCPD | DCPD Grade | Acid Number | Softening Point (°C.) | Gardner Viscosities 33% Solids in ARLO | Gardner Viscosities 50% Solids in Magie 47 Solvent | Tolerance to Magie 47 Solvent |
|---|---|---|---|---|---|---|---|---|
| II-10 | I-6 | 1/3 | 75% | 5 | 162 | — | Z4+ | 32 |

TABLE III
Properties of Rosin/Dicyclopentadiene Resins (Dicyclopentadiene from Texmark)

| Sample Number | Weight Ratio of Rosin to DCPD | DCPD Grade | Acid Number | Softening Point (°C.) | Gardner Viscosities 33% Solids in ARLO | Gardner Viscosities 50% Solids in Magie 47 Solvent | Tolerance to Magie 47 Solvent |
|---|---|---|---|---|---|---|---|
| III-1 | 1/1 | 75 | 33 | 109 | M | G | <5 |
| III-2 | 1/2 | 75 | 19 | 134 | S-T | N | <5 |
| III-3 | 1/3 | 75 | 9 | 161 | Insoluble | W-X | 5 |
| III-4 | 1/4 | 75 | 7 | 172 | Insoluble | Y-Z | 20 |
| III-5 | 1/1 | 85 | 28 | 104 | J-K | D-E | <5 |
| III-6 | 1/2 | 85 | 14 | 136 | T+ | P | <5 |
| III-7 | 1/3 | 85 | 10 | 161 | Insoluble | X-Y | 5 |
| III-8 | 1/4 | 85 | 8 | 181 | Insoluble | Z4+ | 26 |

Comparison of the data presented in Tables II and III, consistently show lower acid numbers and higher softening points for the invention resin over resin formed with unmodified rosin. For the most part, the unmodified rosin/DCPD resins are not suitable for lithographic inks based on viscosities and solvent tolerances.

EXAMPLE 3
Phenolic-Modified Rosin Containing Maleic Anhydride and/or Penterythritol Phenolic-modified rosins were prepared as described in Example 1 to the point Where the reaction mixture reaches 200° C. The mixture was maintained at 200° C. for thirty minutes. Maleic anhydride was added and the mixture stirred for one hour. If the resin contained no pentaerythritol, the resin was then poured into an aluminum pan and allowed to cool, otherwise pentaerythritol was added. The mixture then was heated to 260° C. and maintained at this temperature for one hour and poured into an aluminum pan. Table IV lists the reagents used and the properties of these phenolic-modified rosins.

Analysis of the data in Table IV shows that, indeed, with addition of the polyol, the phenolic-modified rosin intermediate exhibits a lower acid number and a higher softening point, indicating larger molecular size.

EXAMPLE 4
Phenolic-Modified Rosin/Dicyclopentadiene Resins

The required amounts of the various phenolic-modified rosins (from Example 1 or 4) and dicyclopentadiene, resulting in a total reagent mass of 1,110 grams with the desired ratio of reactants (Table V), were added to a two-liter autoclave reactor. The reactor was sealed and purged with nitrogen. The mixture was then heated to 260° C. within one hour. Stirring of the mixture was begun after the temperature reached 120° C. The pressure inside the reactor generally maximized in the range of 90–110 psig. The mixture was maintained at 260° C. for eight hours. The internal pressure then was reduced to 0 psig over a one-hour period. The mixture was stirred an additional 15 minutes at 0 psig with the overhead vent line fully open. Following this, the mixture was sparged with nitrogen at a flow rate of 158 ml/min for four hours. The resin then was discharged into a metal container and allowed to cool.

Gelled ink varnishes were prepared from these resins. A one-liter, round-bottomed flask equipped with thermometer, nitrogen inlet tube, reflux condenser and overhead stirrer was charge with 260 grams of resin, 26 grams of ARLO, and 234 grams of Magie 470 ink solvent. The mixture was heated to 160° C. to dissolve the

TABLE IV
Composition and Properties of Phenolic-Modified Rosins Containing Maleic Anhydride and/or Pentaerythritol
(Weight Percent Reagents Added to Rosin)

| Sample Number | Bisphenol A | Paraformaldehyde | Maleic Anhydride | Pentaerythritol | Acid Number | Softening Point |
|---|---|---|---|---|---|---|
| IV-1 | 10 | 7.3 | 4 | 0 | 162.7 | 136.5° C. |
| IV-2 | 10 | 7.3 | 6 | 0 | 163.6 | 139° C. |
| IV-3 | 10 | 7.3 | 8 | 0 | 188.4 | 138.5° C. |
| IV-4 | 10 | 7.3 | 4 | 2.8 | 130 | 143° C. |
| IV-5 | 10 | 7.3 | 3 | 2.1 | 133 | 144 |
| IV-6 | 10 | 7.3 | 4 | 7.3 | 128 | 144 |
| IV-7 | 8 | 5.8 | 4 | 2.8 | 131 | 130 |
| IV-8 | 8 | 5.8 | 4 | 7.3 | 113 | 135 | resin. Twenty grams of the solution was removed leaving 500 grams of ungelled varnish. To this was added dropwise a mixture of ten grams of oxyaluminum octoate (OAO-EF, Chattem) and ten grams of Magie 470. The mixture was stirred for 45 minutes then poured into a jar. Laray viscosity and yield value measurements were determined after the varnish had cooled to room temperature (Table VI).

Gelled ink varnishes were prepared using the same procedure found in Example 4 (Table VIII).

TABLE VII

Properties of Phenolic-Modified Rosin/Dicyclopentadiene Resins Prepared Using the Procedure of Example 5
(Texmark 75% Grade Dicyclopentadiene Used)

| Sample Number | Phenolic-Modified Rosin Used | Weight Ratio of Phenolic-Modified Rosin to Dicyclopentadiene | Acid Number | Softening Point (°C.) | 33% Solids in ARLO | Gardner Viscosity 50% Solids in MagieSol 47 Solvent | 50% Solids in MagieSol 470 Solvent | Tolerance to Magie 47 | Magie 470 |
|---|---|---|---|---|---|---|---|---|---|
| VII-1 | IV-4 | 1/2 | 18 | 186 | Insoluble | >Z10 | >Z10 | >45 | >45 |
| VII-2 | IV-5 | 1/2 | 16 | 182 | Insoluble | >Z10 | >Z10 | 40 | 44 |
| VII-3 | IV-6 | 1/1.5 | 14 | 176 | Insoluble | >Z10 | >Z10 | 44 | 44 |
| VII-4 | IV-6 | 1/1 | 18 | 161 | Z3–Z4 | Z10– | >Z10 | 43 | 46 |
| VII-5 | IV-7 | 1/2 | 19 | 182 | Insoluble | Z6+ | Z7 | 32 | 39 |
| VII-6 | IV-8 | 1/1.5 | 14 | 173 | Insoluble | Z7– | Z9– | 37 | 41 |

TABLE VIII

Properties of Gelled Varnishes Prepared from the Resins of Example 5[1]

| Resin Used | Viscosity at 2500 sec$^{-1}$ (poise) | Yield Value (dynes/cm$^2$) | Shortness Ratio |
|---|---|---|---|
| VII-1 | 809 | 30,342 | 37 |
| VII-2 | 579 | 24,069 | 42 |
| VII-3 | 499 | 42,000 | 84 |
| VII-4 | 370 | 29,263 | 79 |
| VII-5 | 432 | 7094 | 16 |
| VII-6 | 411 | 12,478 | 30 |

[1]Measurements were made with a Laray viscometer at 25° C.

TABLE V

Phenolic-Modified Rosins Containing Maleic Anhydride and Pentaerythritol Used to Make Phenolic-Modified Rosin/Dicyclopentadiene Resins
(Texmark 75% Grade Dicyclopentadiene Used)

| Sample Number | Phenolic-Modified Rosin Used | Weight Ratio of Phenolic-Modified Rosin to DCPD | Acid Number | Softening Point (°C.) | 33% Solids in ARLO | Gardner Viscosities 50% Solids in Magie 47 Solvent | Tolerance to Magie 47 Solvent |
|---|---|---|---|---|---|---|---|
| V-1 | I-1 | 1/1.5 | 17 | 154 | X– | Z–Z1 | 29 |
| V-2 | I-1 | 1/2 | 15 | 167 | Y | Z4+ | 28 |
| V-3 | IV-1 | 1/1.5 | 23 | 158 | X–Y | Z5– | 39 |
| V-4 | IV-1 | 1/2 | 18 | 171 | Z1–Z2 | Z6+ | 39 |
| V-5 | IV-2 | 1/1.5 | 25 | 159 | Y– | Z7– | 42 |
| V-6 | IV-2 | 1/2 | 21 | 171 | Insoluble | Z7– | 42 |
| V-7 | IV-3 | 1/1.5 | 29 | 159 | Y– | Z10+ | >45 |
| V-8 | IV-4 | 1/2 | 14.3 | 176 | Insoluble | Z7– | 39 |

TABLE VI

Properties of Gelled Varnishes Prepared from the Resins of Example 4[1]

| Resin Used | Viscosity at 2500 sec$^{-1}$ (poise) | Yield Value (dynes/cm$^2$) | Shortness Ratio |
|---|---|---|---|
| V-1 | 56 | 436 | 8 |
| V-2 | 67 | 751 | 11 |
| V-3 | 120 | 1513 | 12 |
| V-4 | 160 | 2286 | 14 |
| V-5 | 155 | 1966 | 13 |
| V-6 | 195 | 1567 | 13 |
| V-7 | 262 | 2488 | 10 |
| V-8 | 315 | 8497 | 27 |

[1]Measurements made with a Laray viscometer operated at 25° C.

EXAMPLE 5

Phenolic-Modified Rosin/Dicyclopentadiene Resins

More examples of using phenolic-modified rosins containing maleic anhydride and pentaerythritol are presented (Table VII). These were prepared using the procedure of Example 4 except that after sparging the molten resin with nitrogen for four hours, the nitrogen flow was reduced (<50 ml/min) and the resin was maintained at 260° C. for an additional seven hours.

EXAMPLE 6

Phenolic-Modified Rosin/Dicyclopentadiene/Vinyl Aromatic Resins

The phenolic-modified rosins used in this example were prepared in a 30-gallon reactor using the same formula and procedure as sample IV-4 (Example 3, Table IV).

Dicyclopentadiene (Lyondell Petrochemical, DCPD 101) and LRO-90 (Lyondell Petrochemical) were poured into a 30-gallon reactor. The agitator was started, and crushed phenolic-modified rosin was added. The mixture was purged with nitrogen for a least fifteen minutes After sealing the reactor, the mixture was heated to 260° C. over a four-hour period. The mixture was maintained at 260° C. for four hours. The reactor was vented, reducing the internal pressure to 0 psig, over a one-hour period. After stirring the mixture for fifteen minutes with the vent line fully open, a nitrogen sparge (flow rate 820 ml/min) was begun. The resin was sparged for four to nine hours (Table IX). The exiting vapor was passed through a vessel containing dry ice to condense the low boiling hydrocarbons. The resin was then cooled to 230° C. for discharge. As the resin cooled, the nitrogen flow was redirected above the liquid level to maintain an inert atmosphere in the reactor.

Gelled varnishes and lithographic inks were prepared from resins XI-1, XI-4 and XI-5. A one-liter, round-bottomed, flask equipped With thermometer, nitrogen inlet tube, reflux condenser and overhead stirrer was charge with 250 grams of resin, 35 grams of a #7 body alkyd, and 215 grams of Magie 470 solvent. The mixture was heated to 170° C. then allowed to cool to 160° C. Ten grams of the mixture was removed. Then 9.8 grams of oxyaluminum octoate (OAO-EF) dissolved in 9.8 grams of Magie 470 solvent was added dropwise. The mixture was stirred 45 minutes then poured into a glass jar and allowed to sit for 24 hours. The inks were prepared by mixing 32.5 grams of the gelled varnish and 17.5 grams of the pigment with a flat-bladed spatula on a glass plate. Copper phthalocyanine blue flushed pigment was added to the gelled varnish containing resin IX-1; lithol rubine flushed pigment was added to the gelled varnishes containing IX-4 and IX-5. To the inks containing resins IX-4 and IX-5, 10 grams of Magie 47 solvent was then mixed into the ink. To the ink containing resin IX-1, 4.95 grams of Magie 470 solvent was then mixed, into the ink. Final mixing of the inks was accomplished on a three-roll mill. Table X lists the properties of the gelled varnishes and inks obtained from resins VII-1, 4 and 5.

temperature of from about 200° C. to about 280° C. at superatmospheric pressure for from about 0.5 to about 10 hours.

2. The ink formulation of claim 1 wherein the pigment is selected from the group consisting of a flushed pigment concentrate, dry pigment, and carbon black.

3. The ink formulation of claim 2 wherein the gelled varnish and pigment are present in a weight ratio of 65:35, respectively.

4. The ink formulation of claim 1 wherein the phenolic-modified rosin is prepared by reaction of a phenol with molten rosin in the presence of an aldehyde at from 120° C. to about 130° C. for from about 1 to 6 hours after which the reaction temperature is raised to about 200° C. for from about 0.5 to about 4 hours.

5. The ink formulation of claim 4 wherein the rosin is selected from the group consisting of tall oil rosin, gum rosin, and wood rosin and the phenol is selected from the group consisting of aryl and alkyl para-substituted phenols.

6. The ink formulation of claim 5 wherein the rosin is tall oil rosin and the phenol is selected from the group consisting of phenol, bisphenol-A, para-tert-butyphenol, para-octylphenol, para-nonylphenol, para-dodecylphenol, para-phenylphenol, and mixtures thereof.

7. The ink formulation of claim 1 wherein the phenol-modified rosin intermediated is further modified by reaction with up to 15% by weight, based on the weight of rosin, of an $\alpha,\beta$-unsaturated carboxylic acid, diacid, or anhydride at from about 170° C. to about 220° C.

8. The ink formulation of claim 7 wherein the $\alpha,\beta$-unsaturated carboxylic acid, diacid, or anhydride is added in an amount of from about 0.5% to about 8.0%

TABLE IX

Properties of Phenolic-Modified Rosin/Dicyclopentadiene/Vinyl Aromatic Resins

| Sample Number | Hours Resin Sparged | Weights (lbs) of Reactants | | | Acid Number | Softening Point | Gardner Viscosity 33% Solids in ARLO | Gardner Viscosity 50% Solids in Magie 47 Solvent | Gardner Viscosity 50% Solids in Magie 470 Solvent | Tolerance to | |
|---|---|---|---|---|---|---|---|---|---|---|---|
| | | Phenolic-Modified Rosin | DCPD | LRO-90 | | | | | | Magie 47 | Magie 470 |
| IX-1 | 9.5 | 64 | 93 | 35 | 18 | 148 | W | | Z+ | | 31 |
| IX-2 | 4 | 64 | 99 | 29 | 14 | 147 | W− | Z3+ | Z1 | 36 | 34 |
| IX-3 | 6 | 64 | 96 | 32 | 15 | 146 | | | Z+ | | 29 |
| IX-4 | 9 | 64 | 109 | 19 | 17 | 144 | X− | Z3− | Z1+ | 36 | 33 |
| IX-5 | 17 | 64 | 109 | 19 | 20 | 165 | Z+ | Z6+ | Z4−Z5 | 38 | 33 |

1. Texmark 75% grade DCPD used.

TABLE X

Properties of Gelled Varnishes and Inks

| | Gelled Varnish | | | Ink | | | Tack 2000 rpms 1 min., 90° F. |
|---|---|---|---|---|---|---|---|
| Resin Used | Viscosity at 2500 sec$^{-1}$, (poise) | Yield Value at 2.5 sec$^{-1}$ | Shortness Ratio | Viscosity at 2500 sec$^{-1}$ (poise) | Yield Value (dynes/cm$^2$) | Shortness Ratio | |
| IX-2 | 209 | 3063 | 15 | 81 | 581 | 7 | 12.4 |
| IX-5 | 193 | 4033 | 21 | 34 | 448 | 13 | 7.5 |
| IX-6 | 323 | 7394 | 23 | 64 | 485 | 8 | 10.4 |

What is claimed

1. A lithographic ink formulation comprising a gelled varnish wherein the gelled varnish comprises an alkyd, a lithographic ink solvent, an aluminum-based gelling agent, and a rosin/hydrocarbon resin having an acid number between 5 and 25, a Gardner viscosity of from Y to Z10, and being prepared by reacting a mixture of phenolic-modified rosin intermediate, with an acid number greater than 90, and dicyclopentadiene at a and is selected from the group consisting of acrylic acid, maleic acid, maleic anhydride, fumaric acid, itaconic acid, and itaconic anhydride.

9. The ink formulation of claim 1 wherein the phenol-modified rosin intermediate is further modified by reaction at from about 200° C. to about 280° C. for from about 1 to about 3 hours with an amount of polyol to produce the phenolic-modified rosin with an acid number greater than 90.

10. The ink formulation of claim 9 wherein the reaction is at from about 245° C. to about 265° C. and the polyol is selected from the group consisting of pentaerythritol, glycerin, ethylene glycol, and sorbitol.

11. The ink formulation of claim 7 wherein the phenol-modified rosin intermediate is further modified by reaction at from about 200° C. to about 280° C. for from about 1 to about 3 hours with an amount of polyol to produce the phenolic-modified rosin with an acid number greater than 90.

12. The ink formulation of claim 11 wherein the reaction is at from about 245° C. to about 265° C. and the polyol is selected from the group consisting of pentaerythritol, glycerin, ethylene glycol, and sorbitol.

13. The ink formulation of claim 1 wherein the reaction temperature is from about 240° C. to about 280° C. for about 3 hours and the weight ratio of phenolic-modified rosin to dicyclopentadiene is about 1:1 to 1:3, respectively.

14. The ink formulation of claim 13 wherein the reaction is conducted in an inert atmosphere under a pressure of from about 40 to about 160 psig.

15. The ink formulation of claim 14 wherein the reaction pressure is from about 40 to about 70 psig and the atmosphere is nitrogen.

16. The ink formulation of claim 15 wherein the rosin/hydrocarbon resin product is sparged with nitrogen by bubbling therethrough from about 0.01 pound nitrogen per pound resin per hour for from 3 to 13 hours.

17. The ink formulation of claim 1 wherein the dicyclopentadiene is present as at least 75% of a mixture including inert hydrocarbons, codimers, and cotrimers.

18. The ink formulation of claim 17 wherein the inert hydrocarbons are selected from the group consisting of toluene, xylenes, and saturated hydrocarbons with from 4 to 6 carbons and the codimers and cotrimers are selected from the group consisting of the Diels-Alder addition products of butadiene, cyclopentadiene, methylcyclopentadiene, and acyclic pentadiene.

19. The ink formulation of claim 1 wherein the rosin/hydrocarbon resin acid number is between 10 and 22 and the reaction mixture further comprises an aromatic hydrocarbon having a vinyl group conjugated to the aromatic ring in an amount less than the amount of dicyclopentadiene.

20. The ink formulation of claim 19 wherein the aromatic hydrocarbon is selected from the group consisting of styrene, vinyltoluene, α-methylstyrene, β-methylstyrene, indene, methylindene, and mixtures thereof, and is added in an amount of from about 5% to about 20%, by weight, of the total reaction mixture.

* * * * *